(12) United States Patent
Hatakeyama

(10) Patent No.: US 10,116,858 B2
(45) Date of Patent: Oct. 30, 2018

(54) IMAGING APPARATUS, CONTROL METHOD THEREOF, PROGRAM, AND RECORDING MEDIUM

(71) Applicant: CANON KABUSHIKI KAISHA, Tokyo (JP)

(72) Inventor: Koki Hatakeyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/703,079

(22) Filed: Sep. 13, 2017

(65) Prior Publication Data

US 2018/0084188 A1    Mar. 22, 2018

(30) Foreign Application Priority Data

Sep. 20, 2016    (JP) .................................. 2016-183357

(51) Int. Cl.
*H04N 5/232*    (2006.01)
*G02B 7/105*    (2006.01)
*G02B 7/09*    (2006.01)

(52) U.S. Cl.
CPC .......... *H04N 5/23212* (2013.01); *G02B 7/09* (2013.01); *G02B 7/105* (2013.01); *H04N 5/23216* (2013.01); *H04N 5/23245* (2013.01)

(58) Field of Classification Search
CPC .......... H04N 5/23212; H04N 5/23216; H04N 5/23245; G02B 7/105; G02B 7/09
See application file for complete search history.

(56) References Cited

U.S. PATENT DOCUMENTS 9,794,502 B2 * 10/2017 Motonaga .............. H04N 5/367
9,812,473 B2 * 11/2017 Miyamoto ........ H01L 27/14607
9,860,443 B2 * 1/2018 Ford .................. H04N 5/23238
2005/0030408 A1 * 2/2005 Ito ........................ H04N 5/2253 348/340
2006/0044463 A1 * 3/2006 Talley ................. H04N 5/2253 348/373
2012/0217606 A1 * 8/2012 Itonaga ............... H01L 31/0203 257/443
2014/0300800 A1 * 10/2014 Sasaki ................ H04N 5/23212 348/347
2016/0277692 A1 * 9/2016 Hatakeyama .......... H04N 5/361
2017/0054929 A1 * 2/2017 Park ..................... H04N 5/3696
2018/0070004 A1 * 3/2018 Du ..................... H04N 5/23212
2018/0084186 A1 * 3/2018 Du ..................... H04N 5/23212

FOREIGN PATENT DOCUMENTS

JP    4707590 B2    6/2011
JP    2012-182194 A    9/2012

* cited by examiner

*Primary Examiner* — Shahbaz Nazrul
(74) *Attorney, Agent, or Firm* — Canon USA, Inc. I.P. Division

(57) ABSTRACT

At least one embodiment of an imaging apparatus has: an imaging plane capable of being curved; an evaluation unit that determines an evaluation value indicating a degree of in-focus of an image signal from the imaging element; an adjustment unit adjusting a position of the focus adjustment lens to a position with the highest evaluation value; and a control unit that controls the curvature of the imaging plane for correcting an image plane curve in the optical system and for bringing the image signal into focus. When the adjustment unit adjusts the position of the focus adjustment lens to an end portion of the movable area, the curvature of the imaging plane is controlled for bringing the image signal into focus on a priority basis.

11 Claims, 14 Drawing Sheets

| FOCAL DISTANCE (ZOOM POSITION) | CURVATURE SETTING |
|---|---|
| 140mm (TELE END) | (i) |
| 112mm | (ii) |
| 84mm | (iii) |
| 56mm | (iv) |
| 28mm (WIDE END) | (v) |

IMAGING APPARATUS, CONTROL METHOD THEREOF, PROGRAM, AND RECORDING MEDIUM

BACKGROUND OF THE INVENTION

Field of the Invention

The present disclosure relates to one or more embodiments of an imaging apparatus, a control method thereof, a program, and a recording medium.

Description of the Related Art

In recent years, there have been known imaging apparatuses such as digital cameras that have a macro imaging mode in which a subject can be shot in proximity, separately from a normal imaging mode. In such an imaging apparatus, the movement area for a focus adjustment lens (focus lens) in the normal imaging mode and the movement area for the focus lens in the macro imaging mode are generally divided to increase the velocity of autofocus (AF). In regard to this, Japanese Patent No. 4707590 proposes a technique by which AF is executed by automatically identifying the driving of the lens from the movement area in the normal shooting mode to the movement area in the macro imaging mode based on information such as AF evaluation value indicative of the contrast of an imaging signal and the position of the focus lens.

Meanwhile, the shooting optical system used in the imaging apparatus has aberration called image plane curve that causes displacement (distortion) in the image-forming position with increase in image height from the center to peripheral portions of the imaging plane. When the imaging apparatus is equipped with an optical zoom function, the state of the image plane curve varies depending on the position of the zoom lens. With regard to such aberration, there has been known a technique by which to correct the image plane curve by receiving subject light on the curved imaging plane of the imaging element. Japanese Patent Laid-Open No. 2012-182194 proposes a technique by which to control the curvature of the imaging plane in conjunction with the movement of the zoom lens.

However, as disclosed in Japanese Patent No. 4707590, even though AF is executed by automatically driving the focus lens to the area for macro imaging, it is not possible to shoot (close-up shooting) the subject beyond the movable range of the focus lens (in proximity to the subject at a distance shorter than the shortest shooting distance). That is, no focus can be achieved on a subject existing at a distance shorter than the shortest shooting distance.

In addition, Japanese Patent Laid-Open No. 2012-182194 proposes a technique by which to perform variable control on the curvature of the imaging plane according to the zoom magnification (focal distance) but does not consider the control of the curvature of the imaging plane in the case of shooting a subject in proximity at a distance shorter than the shortest shooting distance.

SUMMARY OF THE INVENTION

At least one object of the present disclosure is to provide at least one embodiment of an imaging apparatus that achieves a focus on a subject existing in proximity at a distance shorter than the shortest in-focus shooting distance by the movement of the shooting optical system.

An imaging apparatus in at least one embodiment of the present disclosure includes: an optical system that includes a focus adjustment lens that operates to move forward and backward in an optical axis direction in a predetermined movable area; an imaging element that has an imaging plane capable of being curved and that captures an image of a subject formed via the optical system; an evaluation unit that determines an evaluation value indicating a degree of in-focus of an image signal output from the imaging element based on the image signal; an adjustment unit that adjusts, based on the evaluation value, a position of the focus adjustment lens to, among positions in the predetermined movable area, a position with the highest evaluation value; and a control unit that performs control of the curvature of the imaging plane for correcting an image plane curve in the optical system and that performs control of the curvature of the imaging plane for bringing the image signal into focus, wherein, when the adjustment unit adjusts the position of the focus adjustment lens to an end portion of the predetermined movable area, the control unit performs the control of the curvature of the imaging plane for bringing the image signal into focus on a priority basis.

According to other aspects of the present disclosure, one or more additional imaging apparatuses, one or more control methods thereof, and one or more programs or storage mediums for use therewith are discussed herein. Further features of the present disclosure will become apparent from the following description of exemplary embodiments (with reference to the attached drawings).

DESCRIPTION OF THE EMBODIMENTS

First Embodiment

Exemplary embodiments of the present disclosure will be described below in detail with reference to the drawings. In the following description, as an example of an imaging apparatus, a digital camera including an imaging element with an imaging plane capable of being curved will be taken. However, the embodiment is not limited to a digital camera but is also applicable to any devices including an imaging element with an imaging plane capable of being curved. These devices may include, for example, personal computers, cellular phones including smartphones, head-mount displays, game machines, tablet terminals, watch- and eyeglass-type information terminals, medical devices, robot cameras, in-vehicle cameras, and others.

(Configuration of a Digital Camera 100)

Figure 1:
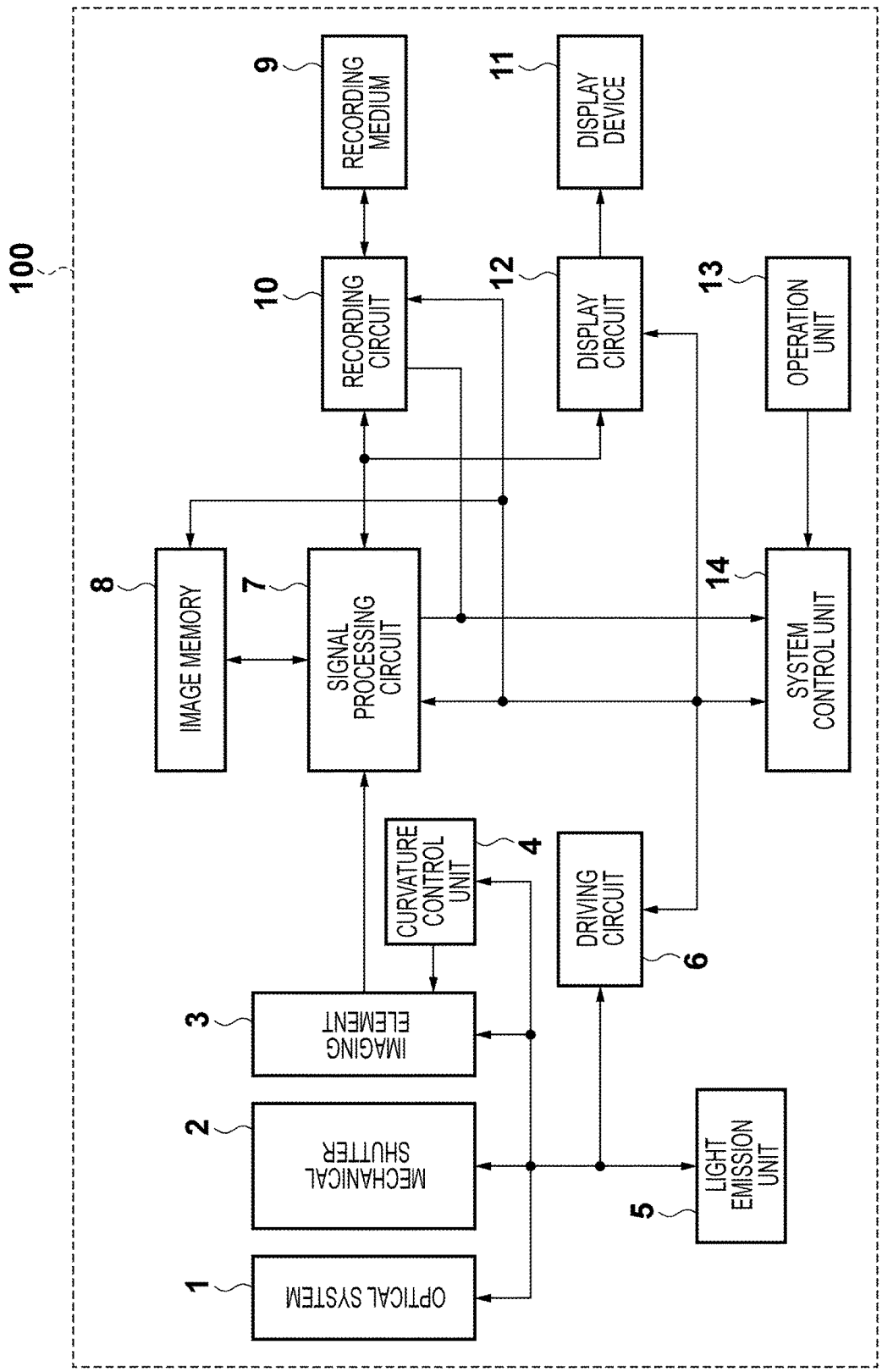
FIG. 1 is a block diagram of a functional configuration example of a digital camera as an example of an imaging apparatus according to at least one embodiment.

FIG. 1 is a block diagram of a functional configuration example of a digital camera 100 as an example of an imaging apparatus according to the embodiment. One or more of the functional blocks illustrated in FIG. 1 may be implemented by hardware such as ASIC or programmable logic array (PLA) or may be implemented by a programmable processor such as a CPU or an MPU executing software. Alternatively, one or more of the functional blocks may be implemented by a combination of software and hardware. Therefore, even if different functional blocks are described below as performing operations, the same hardware may implement the operations in actuality.

An optical system 1 includes a plurality of lenses such as a zoom lens and a focus lens and a diaphragm. A mechanical shutter 2 includes a mechanical shutter that exposes an imaging element 3 to light according to the shutter speed. The imaging element 3 includes an imaging plane capable of being curved described later and converts a subject image formed on an image receiving plane in a photoelectric conversion area into signal charges depending on the light amount and accumulates the same. The imaging element is configured such that a plurality of photoelectric conversion areas is aligned two-dimensionally and may be a CCD image sensor, a CMOS image sensor, or the like, for example. The accumulated signal charges are read as signal voltages by a driving pulse input from a driving circuit 6. The imaging element 3 converts the read signals into digital signal by an A/D converter and outputs the same as image signals to a signal processing circuit 7.

A curvature control unit 4 is configured to control the curvature of the imaging plane of the imaging element 3 as described later, and controls the curvature according to an image plane curve in the optical system 1 to correct the image plane curve. A light emission unit 5 includes a light emission element that acts as a flash. The driving circuit 6 controls the operations of the optical system 1, the mechanical shutter 2, the imaging element 3, the curvature control unit 4, and the light emission unit 5, for example, under instructions from a system control unit 14.

The signal processing circuit 7 performs predetermined image processing on the digital image signals output from the imaging element 3 such as image processing including color conversion, white balance processing, and gamma correction, resolution conversion, image compression, and image correction processing.

An image memory 8 includes a volatile memory, for example, that stores temporarily digital image signals being processed by the system control unit 14 and the signal processing circuit 7 and stores image data as digital image signals having undergone signal processing.

A recording medium 9 includes a non-volatile recording medium formed from a semiconductor memory or the like, for example, and may be detachably attached to the digital camera 100. A recording circuit 10 converts the image data subjected to signal processing by the signal processing circuit 7 and the image data stored in the image memory 8 into data suitable for the recording medium 9 (for example, file system data with a hierarchical structure) and stores the same on the recording medium 9. The recording circuit 10 also controls reading of the image data from the recording medium 9.

A display device 11 includes a display device such as a liquid crystal display, an organic EL display, an electronic paper. The display device 11 displays image data subjected to signal processing by the signal processing circuit 7 or recorded on the recording medium 9 and displays a menu screen and the like for operating the digital camera 100. The display device 11 may include a touch panel included in an operation unit 13 on the top surface of the panel.

A display circuit 12 converts image data into signals suitable for the display device 11 (for example, NTSC-scheme analog signals, RGB signals for LCD display, and others), and displays the same on the display device 11. An operation unit 13 includes a user interface formed from a power button, a release switch, a zoom lever, and a touch panel that accept a user operation. The operation unit 13 detects the user operation and transmits information about the user operation to the system control unit 14.

The system control unit 14 includes a CPU or an MPU, a ROM, and a RAM, for example, and unfolds and executes programs stored in the ROM in the RAM to control the entire digital camera 100 via the foregoing components. For example, the system control unit 14 controls the aperture of the optical system 1 according to brightness to adjust the amount of subject light incident on the imaging element 3. The system control unit 14 further changes the charge accumulation time of the imaging element 3 via the driving circuit 6 to control the exposure amount during shooting. The system control unit 14 also performs necessary control according to the signal transmitted from the operation unit 13.

(Example of Image Plane Curve Assumed in the Embodiment)

Figure 2:
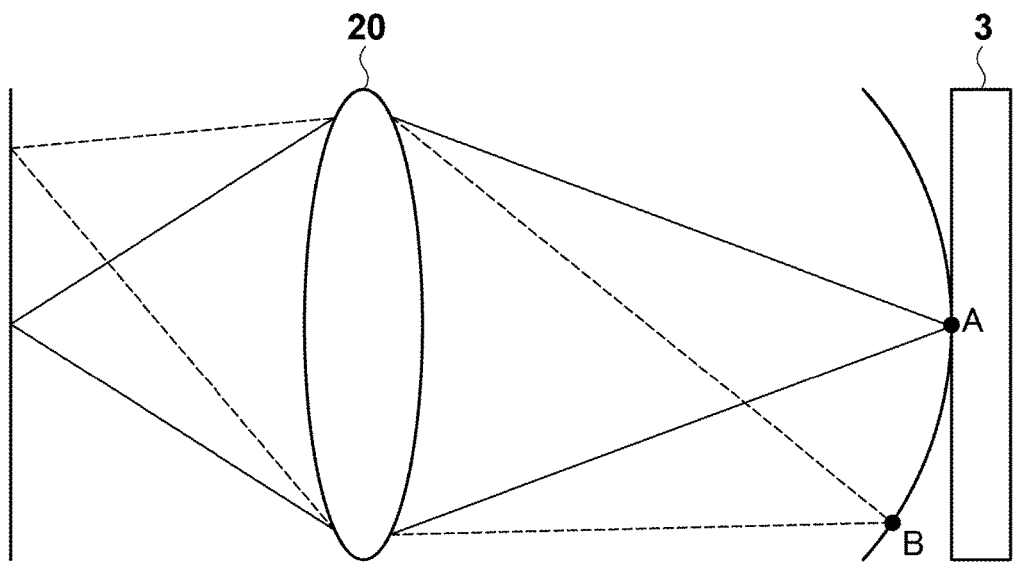
FIG. 2 is a diagram describing an image plane curve caused by an optical lens.
Figure 3A:
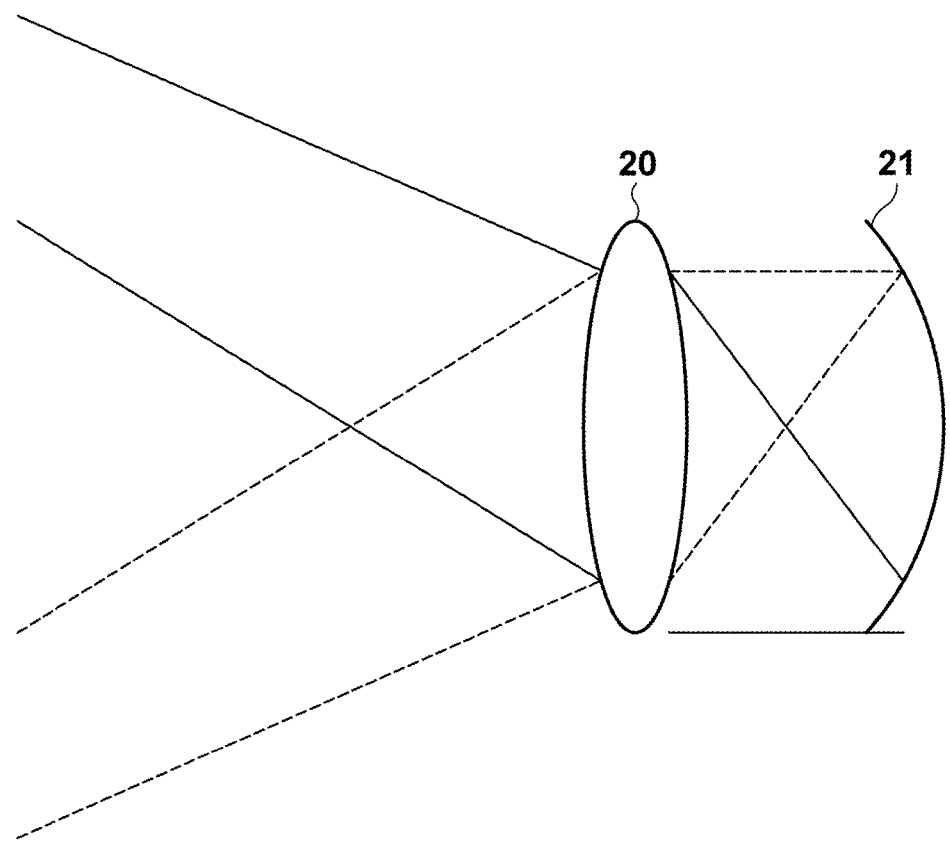
FIGS. 3A and 3B are diagrams describing a difference in image plane curve according to the focal distance (zoom position).
Figure 3B:
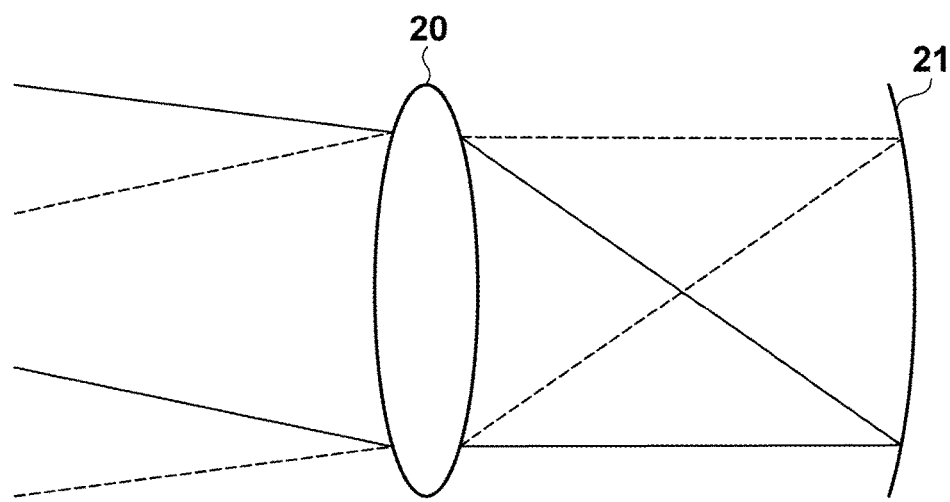

Next, referring to FIGS. 2, 3A, and 3B, an example of image plane curve assumed in the embodiment will be described. FIG. 2 illustrates schematically the state in which a subject image is formed by an optical lens 20 on the imaging plane of the imaging element 3 in the optical system 1. In FIG. 2, the center of the imaging element 3 coincides with an optical axis. In general, the optical lens has an aberration called image plane curve with which the image plane is not flat. The position of the optical lens 20 is adjusted such that the position of image-forming by the optical lens 20 falls at A on the imaging plane in the center of an imaging area of the imaging element 3. However, in the peripheral portions of the imaging area (with increase in image height), the image-forming position falls at B distant from the imaging plane under the influence of the image plane curve, thereby resulting in defocusing. In this way, the image plane curve causes degradation of image quality in the peripheral portions of the image. The image plane curve varies in state depending on the type of the optical lens 20. In the case where the optical lens 20 is a zoom lens, the state of the image plane curve also varies depending on the focal distance of the subject.

Next, referring to FIGS. 3A and 3B, descriptions will be given as to a difference in image plane curve depending on the focal distance (zoom position) of the subject. FIG. 3A illustrates the case in which the focal distance is oriented in a wide-angle direction, which means that the image plane curve is high in degree and an image forming plane 21 (in-focus plane) greatly curves. FIG. 3B illustrates the case in which the focal distance is oriented in a telephoto direction, which means that the image plane curve is smaller and the image forming plane 21 is less distorted than in the wide-angle direction. Although described later in detail, the imaging element 3 according to the embodiment controls the curvature of the imaging plane according to the state of the image plane curve to reduce the image plane curve regardless of the focal distance (zoom position).

(Configuration for Controlling the Curvature of the Imaging Plane)

Figure 4A:
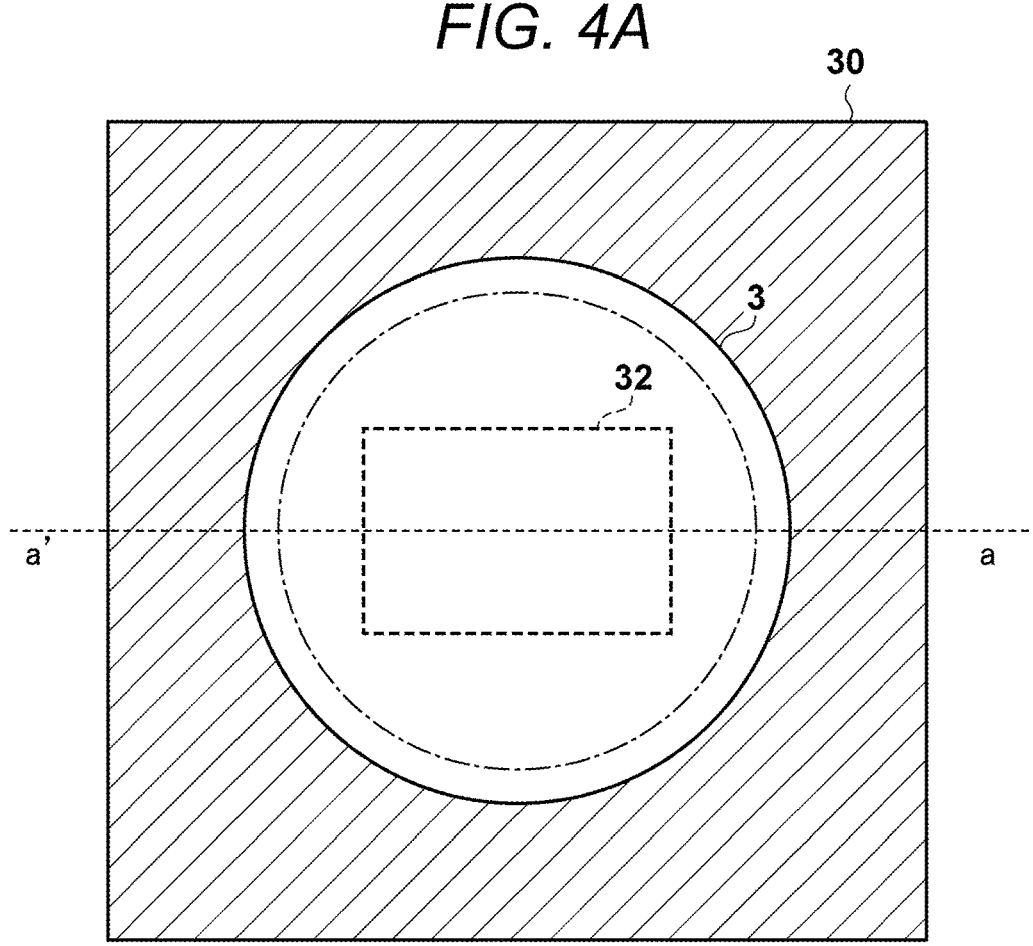
FIGS. 4A and 4B are schematic diagrams of an imaging element and a configuration for controlling the curvature of the imaging plane according to a first embodiment.
Figure 4B:
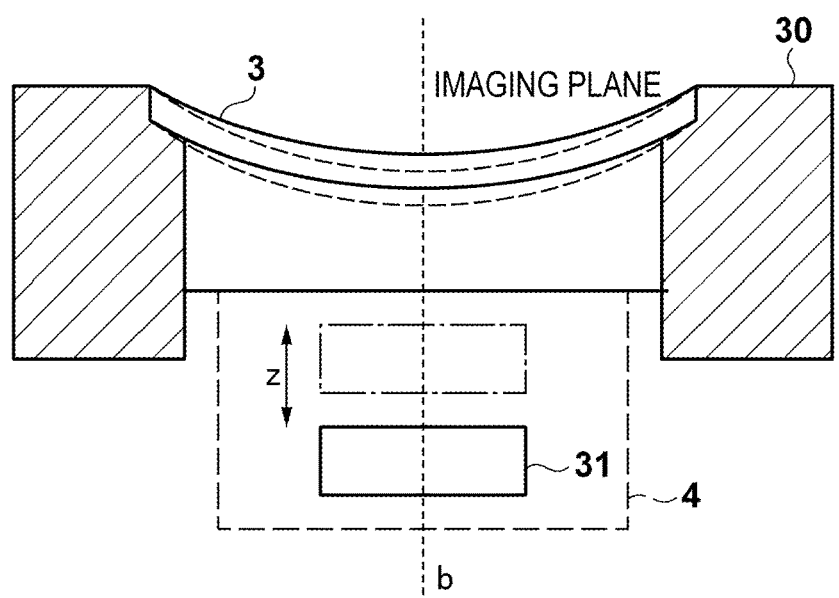

Further, referring to FIGS. 4A and 4B, the imaging element 3 according to the embodiment and a configuration for controlling the curvature of the imaging plane will be described. FIG. 4A illustrates the configuration of the imaging element 3 and its neighborhood from the subject side. FIG. 4B is a cross-sectional view of FIG. 4A taken along line a-a'. The imaging element 3 has an end portion supported by a base 30. One surface of the imaging element 3 has the imaging plane on which a photoelectric conversion area 32 is aligned and the opposite back surface of the same has a magnetic film. The base 30 has a circular space on the center, and the curvature control unit 4 for controlling the imaging plane, that is, the curvature of the imaging element 3, is disposed on the lower side of the space (the lower side in FIG. 4B). The curvature control unit 4 includes a magnet 31 as a magnetic force generation device that is movable in the direction orthogonal to the imaging plane of the imaging element 3 and an actuator not illustrated for moving the magnet 31. The magnet 31 is movable within a range shown with arrow z from a solid-line position to a dashed-line position along an axial line b passing thorough the center of the imaging plane of the imaging element 3 and orthogonal to the imaging plane. The curvature control unit 4 can change arbitrarily the curvature of the imaging element 3 by controlling the position of the magnet 31 within the range z to control the magnetic force for attracting the back surface of the imaging element 3.

Figures 5A, 5B:
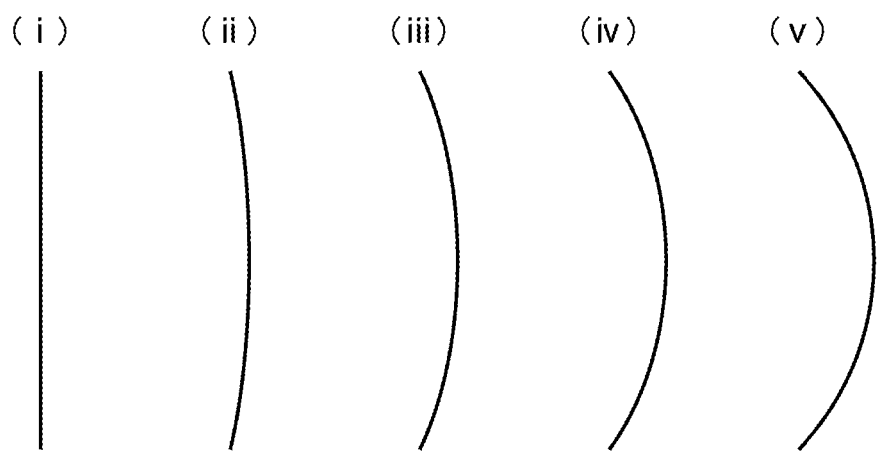
FIGS. 5A and 5B are diagrams illustrating the relationship between the focal distance (zoom position) and the curvature settings of the imaging plane to correct the image plane curve according to the first embodiment.

FIGS. 5A and 5B are diagrams illustrating the relationship between the focal distance (zoom position) of the subject and the curvature settings of the imaging plane in the digital camera 100 according to the first embodiment. In this example, the driving circuit 6 controls the focal distance (zoom position) in five stages (steps) from a wide-angle end (WIDE end) to a telephoto end (TELE end). FIG. 5A is a table that defines the relationship between the focal distances (zoom positions) in the five stages and the curvatures of the imaging plane set for the focal distances. FIG. 5B illustrates schematically the curvatures (curves) of the photoelectric conversion area 32 on the a-a' cross section corresponding to the curvature settings described in FIG. 5A. The codes (i) to (v) indicative of the curvature settings described in FIG. 5A correspond respectively to the codes (i) to (v) described in FIG. 5B.

More specifically, when the focal distance (zoom position) is set in the wide-angle direction (for example, 28 mm), the curvature control unit 4 brings the magnet 31 close to the imaging element 3 to increase tensile force and increase the curve of the imaging plane (decrease the radius of the curvature). Meanwhile, when the focal distance (zoom position) is set in the telephoto direction (for example, 140 mm), the curvature control unit 4 brings the magnet 31 distant from the imaging element 3 to decrease the tensile force and decrease the curve of the imaging plane (increase the radius of the curvature). In this manner, controlling the curvature of the imaging plane of the imaging element 3 according to the focal distance (zoom position) makes it possible to reduce the image plane curve even with changes in the focal distance (zoom position). The table illustrated in FIG. 5A may be preset in the curvature control unit 4 and stored in advance in the ROM of the system control unit 14.

Figure 6:
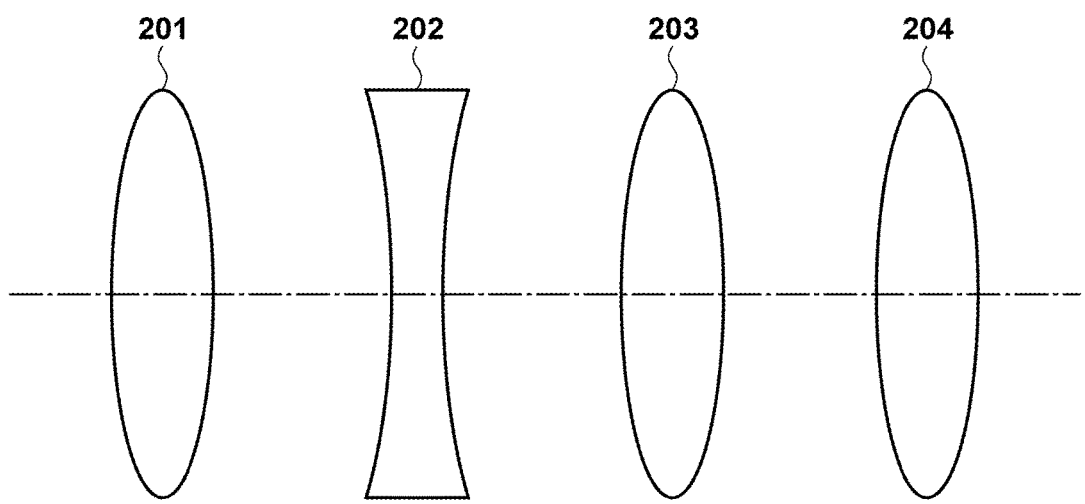
FIG. 6 is a schematic diagram of examples of lens configuration in an optical system according to the first embodiment.

FIG. 6 illustrates examples of lens configuration in the optical system 1 of the digital camera 100. An optical lens requiring a high-magnification zoom function is formed from a large number of lens groups. In the embodiment, four zoom lens groups will be taken as an example. For the sake of simplification, FIG. 6 illustrates each of the lens groups as one lens. First group lenses 201 are fixed lenses called also front lenses. Second group lenses 202 are concave magnification lenses (zoom lenses). The second group lenses 202 can be moved forward and backward by a zoom motor in the optical axis direction, and the focal distance is longer with increasing proximity to the imaging element 3 (the telephoto direction) and the focal distance is shorter with increasing distance from the imaging element 3 (wide-angle direction). Third group lenses 203 are fixed lenses as the first group lenses 201. Fourth group lenses 204 are focus adjustment lenses (focus lenses) that play the role of focus adjustment. The fourth group lenses 204 can be moved forward and backward by a focus motor in the optical direction. The focus is obtained at the infinite end with increasing proximity to the imaging element 3, and the focus is obtained at the nearest end with increasing distance from the imaging element 3.

Figure 7A:
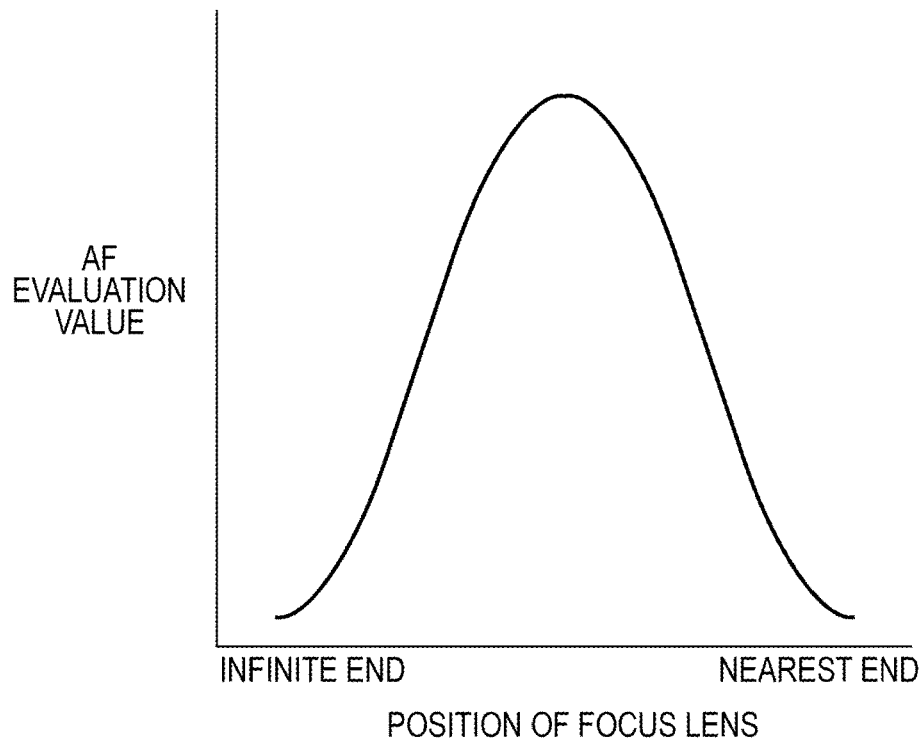
FIGS. 7A and 7B are diagrams illustrating the relationship between the position of the focus lens and AF evaluation value level according to the first embodiment.
Figure 7B:
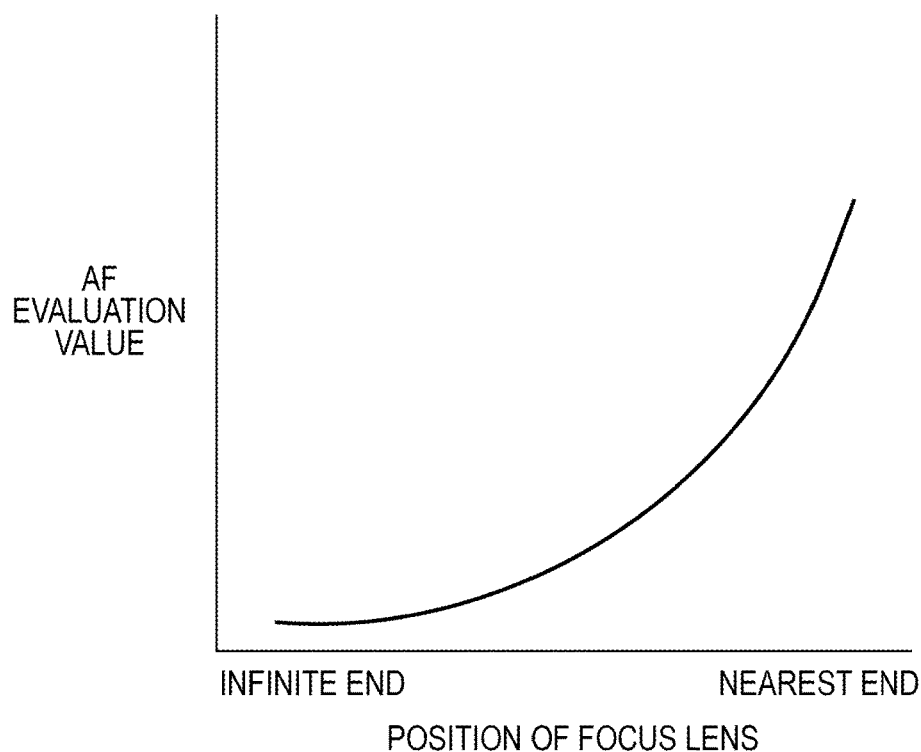

A contrast detection method (contrast AF), as a mode of autofocus (AF) function, will be briefly described. The contrast AF is an AF function by which focus adjustment (focusing) is performed using the actual signal of the subject image formed and read by the imaging element 3. The signal processing circuit 7 determines the integral value of differences in brightness between the adjacent pixels based on the captured digital RGB signals, and outputs the determined integral value of the brightness differences as AF evaluation value indicative of the degree of focusing. In the in-focus state, the outline of the subject is clear and the brightness differences between the adjacent pixels are large, and the AF evaluation value is large. In reverse, in the case of the out-of-focus state, the outline of the subject is blurred, and the brightness differences between the adjacent pixels are small and the AF evaluation value is small. To execute the AF operation, the system control unit 14 acquires sequentially a plurality of AF evaluation values while moving the fourth group lenses 204 via the driving circuit 6 and stops the lenses at the position with the greatest AF evaluation value (that is, the peak point where the focus is most obtained) as in-focus point. FIGS. 7A and 7B illustrate the relationship between the focus lens position and the AF evaluation value level in the case of performing the AF control as described above. FIG. 7A indicates that there exists the peak of the AF evaluation value when the focus lenses are moved from the infinite end to the nearest end.

When the AF evaluation values are acquired in this manner, the fourth group lenses 204 (focus lenses) are controlled and positioned at the peak point, that is, the in-focus point. Meanwhile, there may not exist the peak of the AF evaluation value within the movable area of the fourth group lenses 204. For example, as illustrated in FIG. 7B, the AF evaluation value may be larger as the fourth group lenses 204 move toward the nearest end. When the AF evaluation value constantly increases, for example, the subject is considered to be located at a distance shorter than the shortest shooting distance of the digital camera 100. That is, there exists no peak of the AF evaluation value, which means that the subject to be shot cannot be brought into focus. When such the AF evaluation value is detected, the system control unit 14 can inform the user of the out-of-focus state by outputting a warning sound from a speaker not illustrated or displaying a warning message on the display device.

Figure 8:
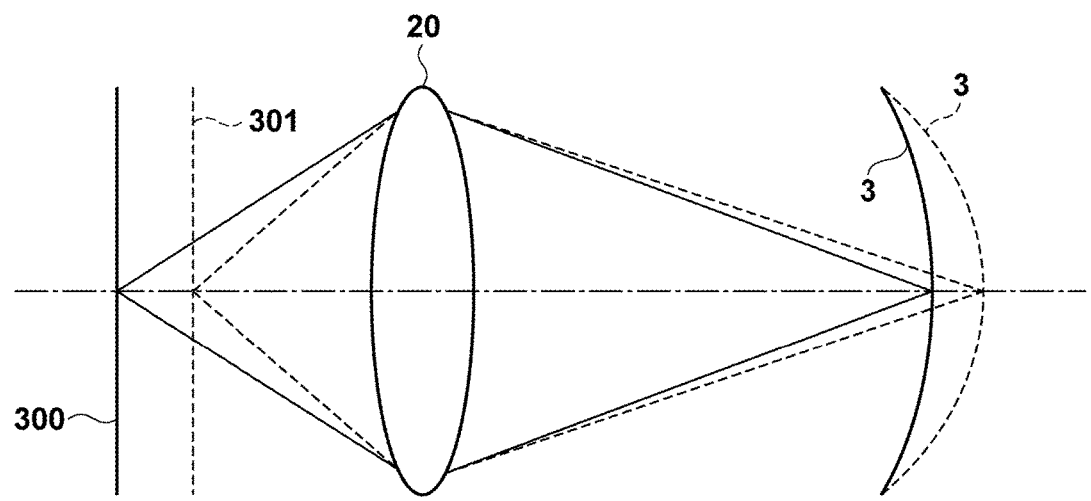
FIG. 8 is a diagram illustrating the relationship among the curvature of the imaging element, the central position of the imaging plane, and the position of a subject plane formed on the imaging plane according to the first embodiment.

Next, referring to FIG. 8, the relationship between the curvature of the imaging element and the position of the subject plane formed on the imaging plane will be described. As stated above, in the embodiment, the curvature of the imaging element 3 can be arbitrarily changed by the curvature control unit 4 moving the magnet 31 to control the magnetic force for attracting the back surface of the imaging element 3. In FIG. 8, the curvature of the imaging plane of the imaging element 3 shown by a solid line (FIG. 8 illustrates only the imaging plane) is controlled to the optimum curvature for correcting the imaging plane curve in the optical lens 20. In this case, the distance to the subject whose an optical image is formed on the imaging plane in the state focused via the optical lens 20 corresponds to the position of a subject plane 300. When the magnet 31 is brought closer to the imaging element 3 to change to the curvature shown by a dotted line, the center of the imaging plane is shifted to the right side in the drawing in the optical axis direction. In this case, the distance to the subject whose an image is formed on the imaging plane (in focus) via the optical lens 20 corresponds to the position of a subject plane 301 shown by a dotted line. That is, when the curvature of the imaging element 3 is larger (the radius of the curvature is smaller), the position of the subject plane in focus comes closer to the optical lens 20. In the embodiment, the curvature of the imaging element 3 is controlled with the use of this characteristic to change the shortest shooting distance during shooting.

(Overview of the Curvature Control Process)

Figure 9A:
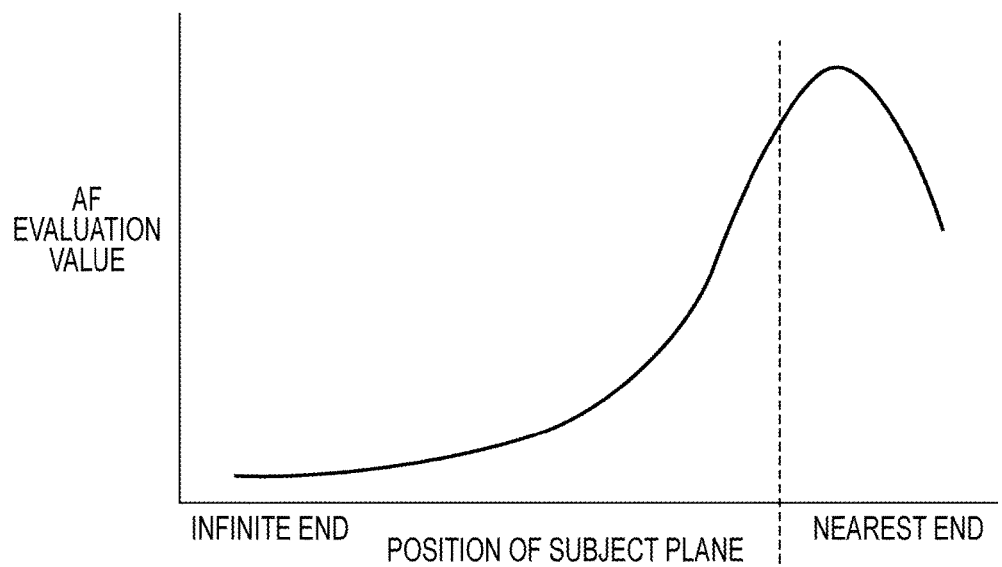
FIGS. 9A to 9C are diagrams illustrating the relationship among the position of the focus lens, the curvature of the imaging plane, and the AF evaluation value according to the first embodiment.
Figure 9B:
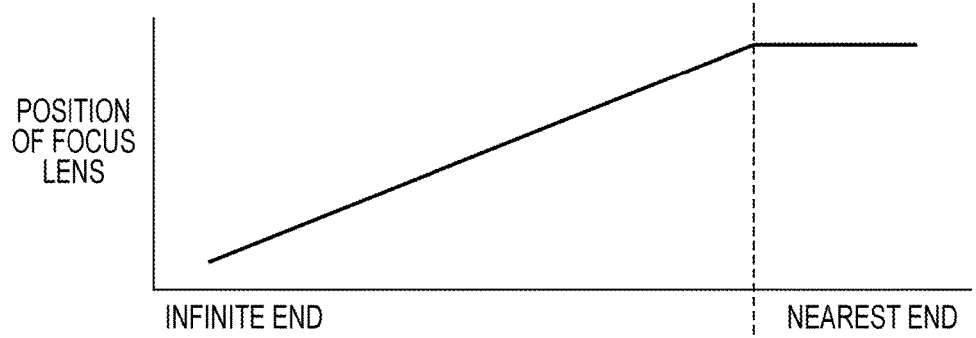
Figure 9C:
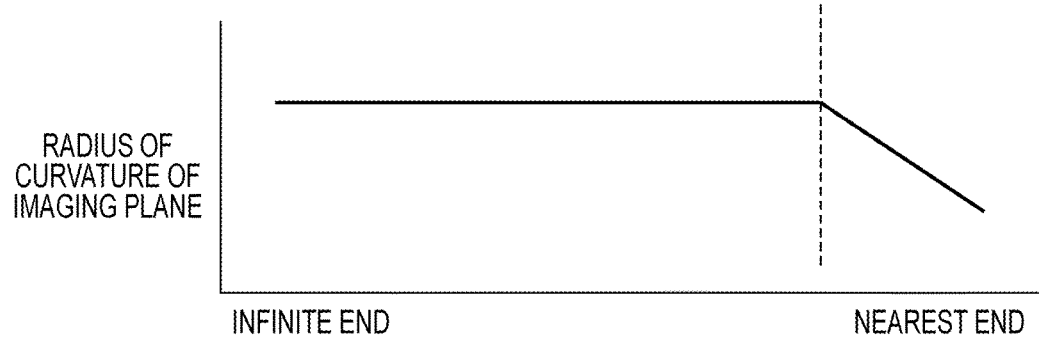

An overview of the curvature control process of the imaging element 3 during the AF operation according to the embodiment will be provided. FIGS. 9A to 9C are diagrams illustrating the relationships among the AF evaluation value, the position of the fourth group lenses 204 (focus lenses), and the radius of the curvature of the imaging plane with the position of the subject plane between the infinite end and the nearest end. As the focus lens moves from the infinite end to the nearest end, the AF evaluation value is greater. In this case, the curvature of the imaging plane remains fixed to the optimum curvature for correcting the image plane curve. The vertical dotted line in FIGS. 9A to 9C indicates the state in which the focus lens has reached the limit position (at the nearest end) in the movable area. The AF evaluation value becomes larger as the position of the subject plane moves increasingly toward the nearest end, and it is thus considered that the subject does not exist at least in an in-focus range within the movable area of the focus lens but exists closer to the nearest end. The focus lens cannot move beyond the limit position, and the curvature of the imaging element 3 changes from the outside of the limit position. The position of the focus lens is fixed on the right side of the dotted line as illustrated in FIG. 9B, and instead, the curvature of the imaging element 3 gradually increases (the radius of the curvature becomes smaller) as illustrated in FIG. 9C. For example, the curvature control unit 4 brings the magnet 31 gradually closer to the imaging element 3 to increase the magnetic force for attraction. With the peak of the AF evaluation value in the course of changing the curvature of the imaging plane, the system control unit 14 controls the position of the magnet 31 such that the position with the peak of the AF evaluation value (the curvature condition for in-focus) can be attained.

Figure 10A:
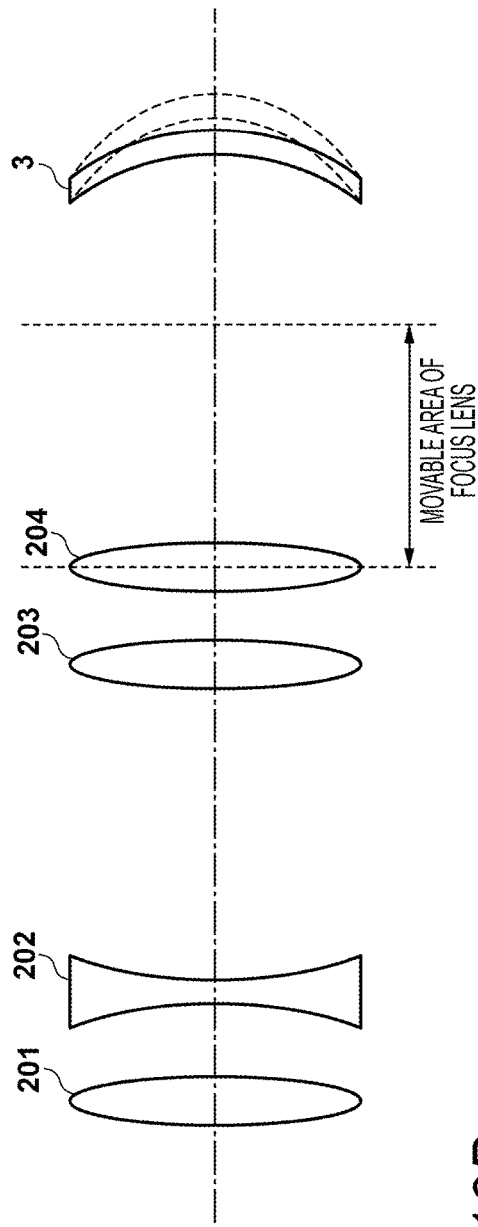
FIGS. 10A and 10B are diagrams illustrating the relationship between the position of the optical system and the curvature of the imaging element according to the first embodiment.
Figure 10B:
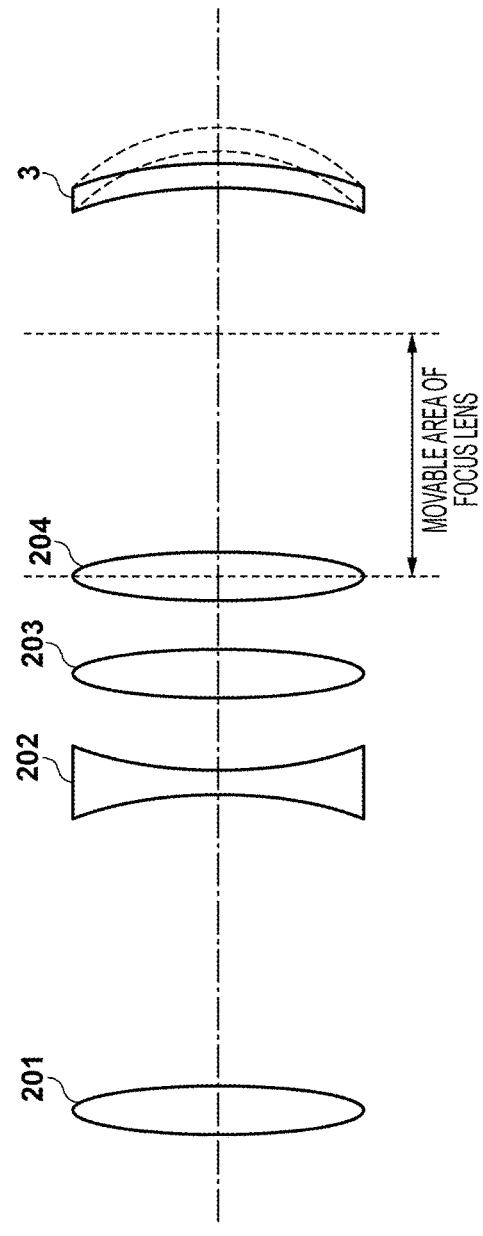

FIGS. 10A and 10B illustrate a combination of the lens configuration of the optical system 1 illustrated in FIG. 6 and the imaging element 3. FIG. 10A illustrates the positional relationships among the optical lens groups 201 to 204 and the curve state of the imaging element 3 with the focal distance oriented in the wide-angle direction. When the focal distance is oriented in the wide-angle direction, the degree of the image plane curve is high and the curvature of the imaging element for correcting the curve is greater. FIG. 10B illustrates the positions of the optical lens groups 201 to 204 and the curve state of the imaging element 3. When the focal distance is oriented in the telephoto direction, the degree of the image plane curve is lower than that in the case of the wide-angle direction, and the curvature of the imaging element can be made smaller. The fourth group lenses 204 (focus lenses) illustrated in FIGS. 10A and 10B are located at the limit position (the nearest end) in the movable area. The curve states of the imaging element 3 shown by solid lines in FIGS. 10A and 10B have the optimum curvatures for correcting the image plane curve in their respective cases. Meanwhile, the curve states of the imaging element 3 shown by dotted lines have the greater curvatures (the smaller radii of the curvatures) because the curvatures of the imaging planes are further changed to obtain a focus at a distance shorter than the shortest shooting distance determined by the optical lens. This makes it possible to obtain a focus on the subject that would not be focused within the movable range of the optical lens. The curvature of the imaging element 3 is controlled differently from the optimum curvature for correcting the image plane curve in the optical lens, and thus the image plane curve may not necessarily be corrected to the optimum state at the peripheral portions of the image.

(Series of Steps in the AF Operation Including the Curvature Control Process)

Figure 11:
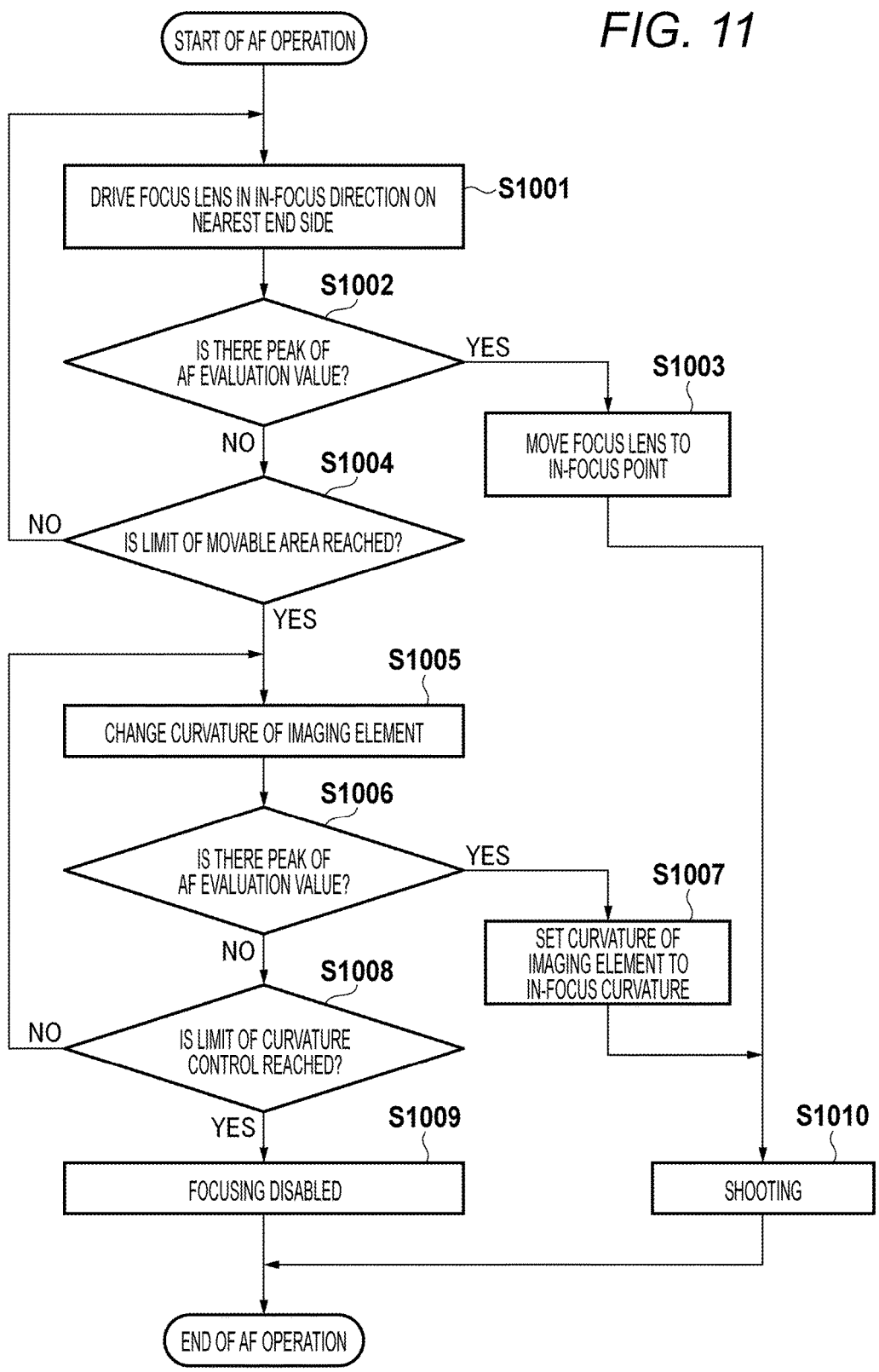
FIG. 11 is a flowchart of a series of steps in AF operation in the first embodiment.

Next, a series of steps in the AF operation including the curvature control process according to the embodiment will be described with reference to FIG. 11. The release switch included in the operation unit 13 of the embodiment varies in functionality depending on two stages, that is, the half-press state and the full-press state. The series of steps is started by half-pressing the release switch. In addition, this process is implemented by the system control unit 14 unfolding and executing the programs stored in the ROM to a work area in the RAM to control the components of the digital camera 100 such as the curvature control unit 4. In the following description, a subject existing at a position relatively close to the shooter will be taken as an example.

At S1001, when the system control unit 14 starts the AF operation, the system control unit 14 moves the fourth group lenses 204 (focus lenses) in the direction in which the AF evaluation value becomes larger (that is, the direction in which a focus is obtained at the nearest end). The system control unit 14 moves the fourth group lenses 204 (focus lenses) in sequence and uses the image data obtained at the moved positions of the focus lenses to acquire the AF evaluation values.

At S1002, the system control unit 14 determines whether there is the position with the maximum AF evaluation value (that is, the peak of the AF evaluation value). For example, the system control unit 14 determines whether it is possible to obtain the maximum one of the plurality of AF evaluation values, or the relative maximum within the movable area of the fourth group lenses 204 in the AF evaluation value curve predicted from the plurality of AF evaluation values. When determining that there is the peak of the AF evaluation value, the system control unit 14 moves the process to S1003. When not determining that there is the peak of the AF evaluation value, the system control unit 14 moves the process to S1004.

At S1003, the system control unit 14 moves the focus lenses to the peak position of the AF evaluation value. After that, at S1010, shooting is started with a full press of the release switch, and the series of steps in the AF operation are terminated.

At S1004, the system control unit 14 determines whether the fourth group lenses 204 (focus lenses) has reached the limit position (end portion) in the movable area. For example, the system control unit 14 makes the determination based on whether the current position of the fourth group lenses 204 (focus lenses) has exceeded a threshold indicating the position of the end portion. When not determining that the fourth group lenses 204 (focus lenses) has yet reached the end portion, the system control unit 14 returns the process to S1001 to continue the AF operation. When determining that the fourth group lenses 204 (focus lenses) have reached the end portion, the focus lenses cannot be moved any more, and the system control unit 14 stops the focus lenses at the end portion and moves the process to S1005.

At S1005, the system control unit 14 changes the curve state of the imaging element 3 instead of moving the fourth group lenses 204 (focus lenses). Specifically, the system control unit 14 brings the magnet 31 of the curvature control unit 4 gradually closer to the imaging element 3 to increase the magnetic force for attraction.

At S1006, the system control unit 14 acquires the AF evaluation values of the image data output from the imaging element 3 while changing the curvature of the imaging plane, and determines whether there is the peak of the AF evaluation value. Specifically, the system control unit 14 determines whether there is a position with the maximum AF evaluation value. When determining that there is the peak of the AF evaluation value, the system control unit 14 moves the process to S1007. When not determining that there is the peak of the AF evaluation value, the system control unit 14 moves the process to S1008.

At S1007, with the peak position of the AF evaluation value, the system control unit 14 sets the curve state of the imaging plane of the imaging element 3 to that curvature. After that, the system control unit 14 moves the process to S1010 to start shooting with a full press of the release switch, and terminates the series of steps in the AF operation.

At S1008, after not determining that there is the peak position of the AF evaluation value, the system control unit 14 determines whether the imaging plane of the imaging element 3 has reached the limit of the curvature control range. The system control unit 14 determines whether the current curvature has exceeded a predetermined threshold (based on the output from the curvature control unit 4 or the driving circuit 6). When not determining that the curvature has yet reached the limit, the system control unit 14 returns the process to S1005 to continue the curvature control. When determining that the curvature of the imaging element 3 has reached the limit position, the system control unit 14 moves the process to S1009.

At S1009, the system control unit 14 determines that focusing is disabled because the imaging plane of the imaging element 3 cannot be curved any more, and then terminates the series of step in the AF operation.

As described above, the curvature of the imaging element 3 is controlled differently from the curvature for correcting the image plane curve in the optical lens, and thus the image plane curve may not necessarily be corrected to the optimum state at the peripheral portions of the image. Therefore, when the process for changing the curvature of the imaging element is started (S1005), the display device 11 may display a message or a frame to prompt the user to bring the desired area of the subject to be shot in close-up to the center of the screen, for example. This makes it possible to obtain the close-up image focused on the subject under less influence of the image plane curve.

In the embodiment, as described above, when the subject is at a near distance and cannot be focused by the movement of the focus lenses, the curvature of the imaging plane of the imaging element 3 is changed to obtain the maximum AF evaluation value. Specifically, when the subject is at a near distance, higher priority is given to the control of the curvature for bringing the image signal into focus than the control of the curvature of the imaging plane for correcting the image plane curve. This makes it possible to shoot the in-focus image of the subject even when the subject is at a near distance and cannot be focused by the movement of the focus lenses.

Second Embodiment

Next, a second embodiment will be described. According to the second embodiment, the curvature of the imaging element 3 is changed to obtain a focus on a subject at a near distance only when the digital camera 100 is set in a predetermined operation mode (an extended macro mode in the example of the embodiment). Accordingly, the digital camera 100 of the second embodiment is different in some of the steps in the AF operation from the digital camera 100 of the first embodiment but is identical in configuration and the other steps to the digital camera 100 of the first embodiment. Therefore, the same components and steps as those of the first embodiment will be given the same reference signs as those of the first embodiment and descriptions thereof will be omitted. The differences from the first embodiment will be intensively described below.

The digital camera 100 of the embodiment includes a specific operation mode called extended macro mode. The extended macro mode is one of the operation modes and is set by a button in the operation unit 13 or from an operation menu. The curvature control of the imaging element during the AF operation according to the embodiment is carried out only when the extended macro mode is selected.

Figure 12:
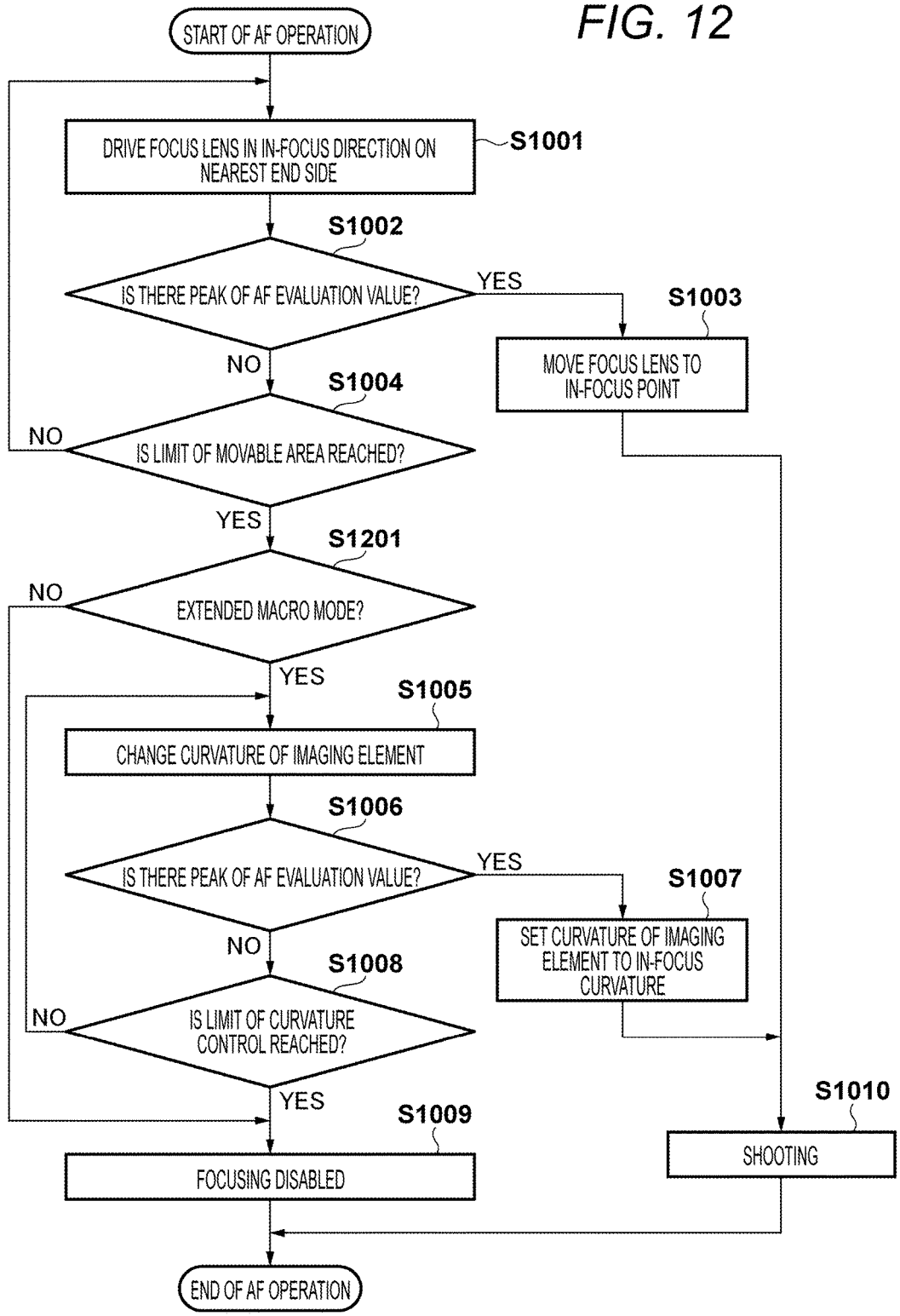
FIG. 12 is a flowchart of a series of steps in AF operation in a second embodiment.

FIG. 12 is a flowchart of a series of steps in the AF operation according to a second embodiment. The system control unit 14 starts the AF operation in the same manner as in the first embodiment to perform S1001 to S1004.

The system control unit 14 determines at S1201 whether the currently set operation mode is the extended macro mode. For example, the system control unit 14 reads from the RAM the information on the operation mode set via the operation unit 13, for example, and determines whether the read operation mode is the extended macro mode. When determining that the set operation mode is the extended macro mode, the system control unit 14 moves the process to S1005 to enable the change of the curvature of the imaging element. As in the first embodiment, the system control unit 14 performs S1005 to S1007, for example, to change the curvature of the imaging element to obtain a focus on the subject for shooting. When not determining that the set operation mode is the extended macro mode, the system control unit 14 moves the process to S1009 to determine that focusing is disabled, and terminates the AF operation.

According to the embodiment as described above, the curvature control of the imaging element during the AF operation is enabled when the specific operation mode is set. This makes it possible to switch according to the user's intention between the operation mode in which the AF operation is to be performed at a high speed and the quick response on the enabling or disabling of focusing is to be obtained and the operation mode in which focus is to be obtained beyond the movable range of the focus lenses even with some reduction in the response speed.

Third Embodiment

Next, a third embodiment will be described. According to the third embodiment, the curvature of the imaging element 3 is changed to focus on a subject at a near distance only when the user performs a predetermined operation on the digital camera 100. Accordingly, the digital camera 100 of the third embodiment is different in some of the steps in the AF operation from the digital camera 100 of the first embodiment but is identical in configuration and the other steps to the digital camera 100 of the first embodiment. Therefore, the same components and steps as those of the first embodiment will be given the same reference signs as those of the first embodiment and descriptions thereof will be omitted. The differences from the first embodiment will be intensively described below.

As described above, changing the curvature of the imaging element 3 means shifting the center of the imaging plane in the direction orthogonal to the optical axis, which makes it possible to focus on a subject that cannot be focused within the movable range of the optical lens. However, since the curvature is controlled to be different from the curvature for correcting the image plane curve in the optical system, the image plane curve may not be necessarily corrected to the optimum state at the peripheral portions of the image. Accordingly, the user operation is checked in the state in which the end portion of the movable area of the focus lenses is reached to confirm the user's intention of increasing or not the curvature of the imaging element 3 to further execute the AF operation. To place a higher priority on the focusing in the center of the image, the user enters a predetermined user instruction (pressing and holding the release switch for a predetermined period of time or more in the embodiment).

Figure 13:
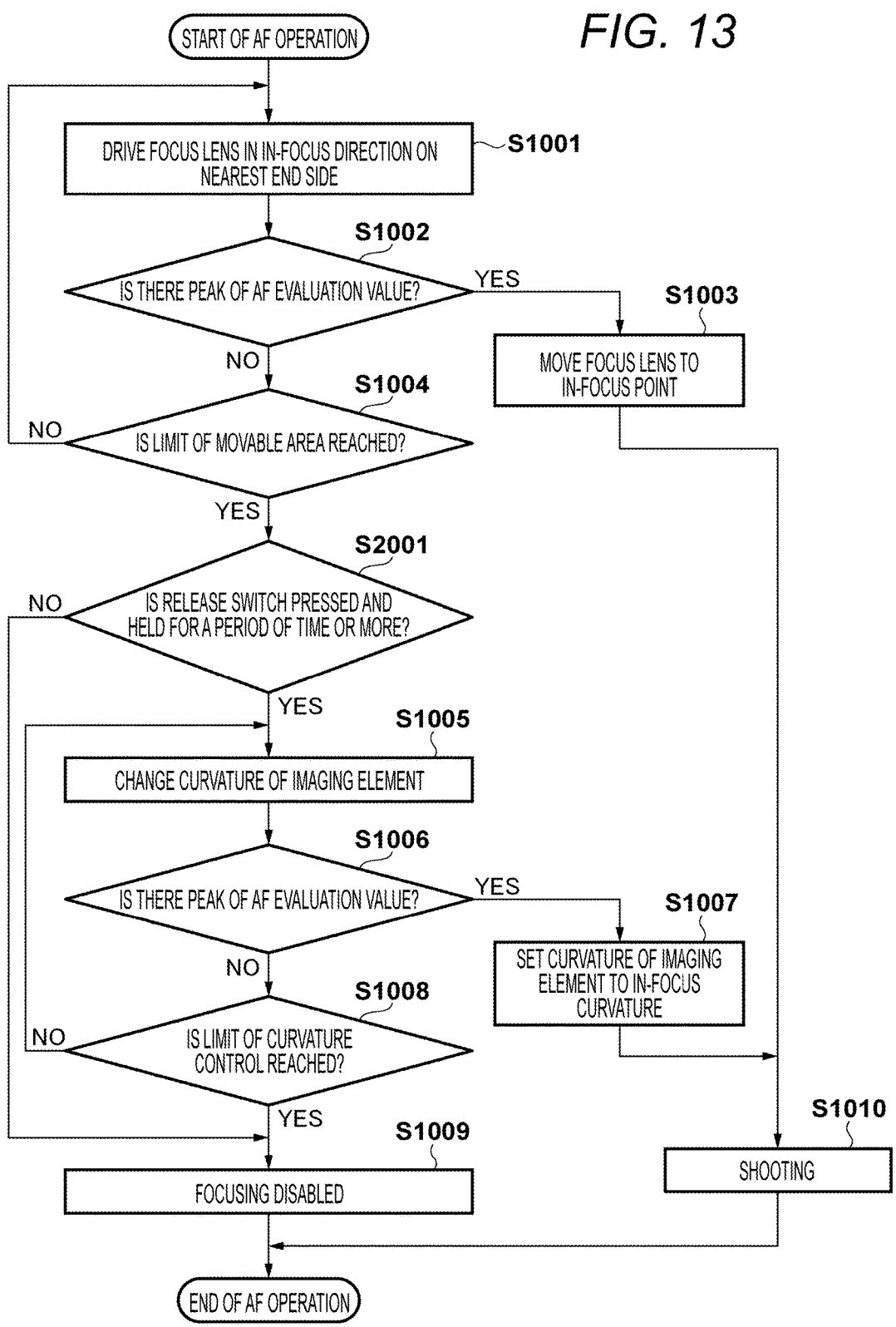
FIG. 13 is a flowchart of a series of steps in AF operation in a third embodiment.

FIG. 13 is a flowchart of a series of steps in AF operation in a third embodiment. The system control unit 14 starts the AF operation in the same manner as in the first embodiment to perform S1001 to S1004.

The system control unit 14 determines at S2001 whether the release switch included in the operation unit 13 is pressed and held for a predetermined period of time or more. Specifically, the system control unit 14 determines whether the user instruction for executing the AF operation with further increase in the curvature of the imaging element 3 is entered in the state in which the end portion of the movable area of the focus lenses is reached. For example, when the release switch is pressed, the system control unit 14 measures via the operation unit 13 the time during which the release switch is held down, and determines whether the time exceeds a predetermined threshold. When determining that the release switch is pressed and held for a predetermined period of time or more, the system control unit 14 moves the process to S1005 to change the curvature of the imaging element. As in the first embodiment, the system control unit 14 performs S1005 to S1007, for example, to change the curvature of the imaging element to obtain a focus on the subject for shooting. When there is no user instruction for executing the AF operation with a curve in the imaging plane (a long-time press of the release switch) in the state in which the end portion of the movable area of the focus lenses is reached, the system control unit 14 moves the process to S1009 to determine that focusing is disabled, and terminates the AF operation.

In the embodiment as described above, the presence or absence of a predetermined user operation (the long-time depression of the release switch in the embodiment) is determined in the state in which the end portion of the movable area of the focus lenses is reached. This makes it possible to confirm the user's intention of increasing or not the curvature of the imaging element 3 to further execute the AF operation.

Fourth Embodiment

Next, a fourth embodiment will be described. In the fourth embodiment, as in the third embodiment, the user's intention of increasing or not the curvature of the imaging element 3 to further execute the AF operation is confirmed in the state in which the end portion of the movable area of the focus lenses is reached. However, the fourth embodiment is different in procedure from the third embodiment. To place a higher priority on the focusing in the center of the image, the user performs a series of actions (gestures) of releasing the release switch once and then pressing the release switch again immediately. Accordingly, the digital camera 100 of the fourth embodiment is different in some of the steps in the AF operation from the digital camera 100 of the first embodiment but is identical in configuration and the other steps to the digital camera 100 of the first embodiment. Therefore, the same components and steps as those of the first embodiment will be given the same reference signs as those of the first embodiment and descriptions thereof will be omitted. The differences from the first embodiment will be intensively described below.

Figure 14:
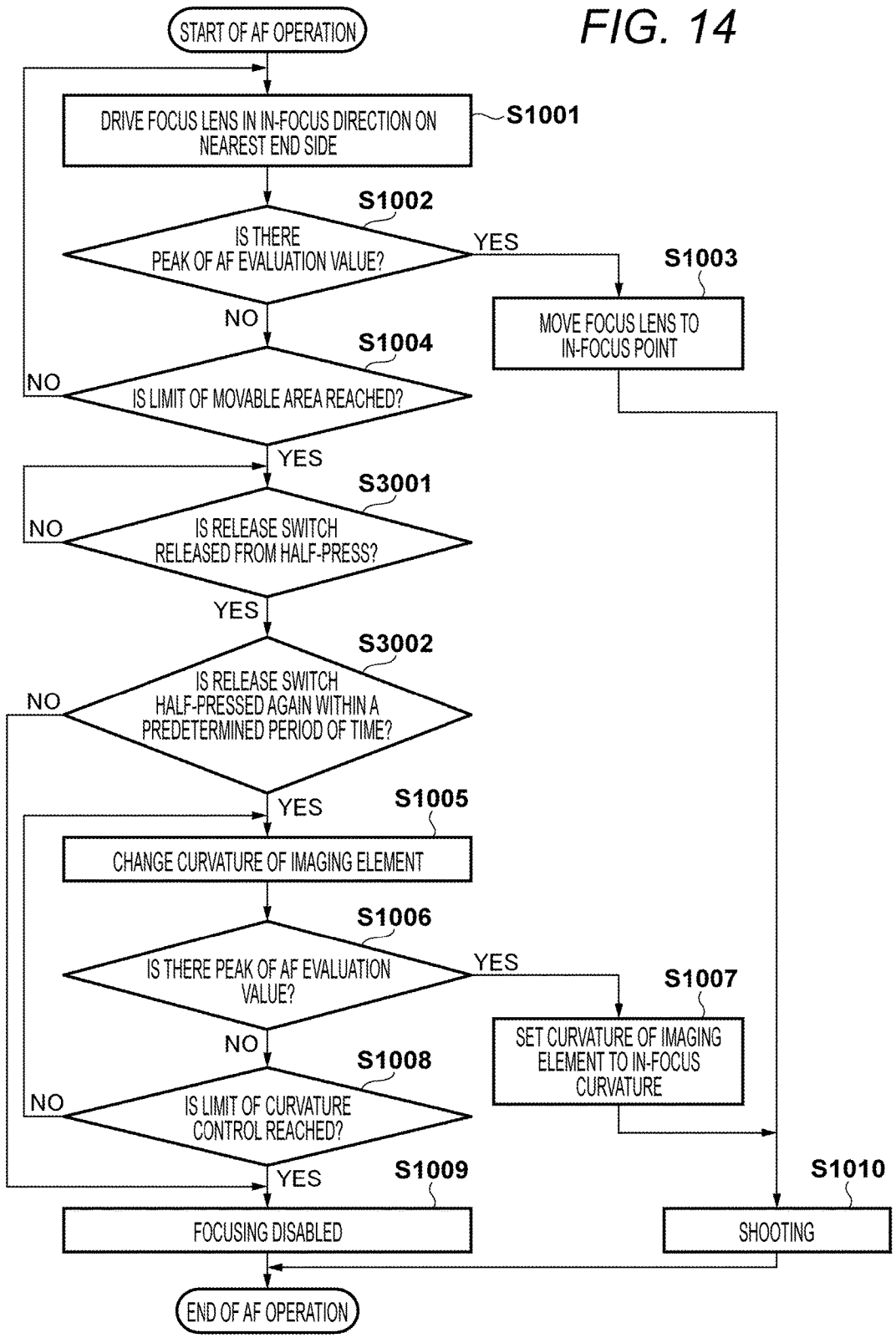
FIG. 14 is a flowchart of a series of steps in AF operation in a fourth embodiment.

The series of steps in the AF operation according to the fourth embodiment will be described with reference to FIG. 14. The system control unit 14 performs S1001 to S1004 as in the third embodiment.

The system control unit 14 determines at S3001 whether the half-press of the release switch in the operation unit 13 is canceled. When determining that the release switch is released based on the information from the operation unit 13, the system control unit 14 moves to S3002. When not determining that the release switch is released, the system control unit 14 moves the process to S3001.

The system control unit 14 determines at S3002 whether the release switch is half-pressed again within a predetermined period of time (for example, one second). When determining that the release switch is half-pressed again within a predetermined period of time (for example, one second) based on the information from the operation unit 13, the system control unit 14 moves the process to S1005 to change the curvature of the imaging element. In this case, the system control unit 14 performs S1005 to 51010 and then terminates the series of steps in the AF operation. When not determining that the release switch is half-pressed again within a predetermined period of time, the system control unit 14 moves the process to S1009 to determine that focusing is disabled, and terminates the series of steps in the AF operation.

As described above, in the embodiment, the series of user's actions (gestures) of releasing the release switch once and then pressing the same again are detected to confirm the user's intention in the state in which the end portion of the movable area of the focus lenses is reached. This makes it possible to differentiate clearly between the action for the AF operation (half-press of the release switch) and the actions for conforming the user's intention.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-183357, filed Sep. 20, 2016, which is hereby incorporated by reference herein in its entirety.

What is claimed is:

1. An imaging apparatus comprising:
    an optical system that includes a focus adjustment lens that operates to move forward and backward in an optical axis direction in a predetermined movable area;
    an imaging element that has an imaging plane capable of being curved and that captures an image of a subject formed via the optical system;
    an evaluation unit that determines an evaluation value indicating a degree of in-focus of an image signal output from the imaging element based on the image signal;
    an adjustment unit that adjusts, based on the evaluation value, a position of the focus adjustment lens to, among positions in the predetermined movable area, a position with the highest evaluation value; and
    a control unit that performs control of the curvature of the imaging plane for correcting an image plane curve in the optical system and that performs control of the curvature of the imaging plane for bringing the image signal into focus, wherein
    in a case where the adjustment unit adjusts the position of the focus adjustment lens to an end portion of the predetermined movable area, the control unit performs the control of the curvature of the imaging plane for bringing the image signal into focus on a priority basis.

2. The imaging apparatus according to claim 1, wherein, in a case where the adjustment unit adjusts the position of the focus adjustment lens to the end portion of the predetermined movable area, the control unit controls the curvature of the imaging plane for obtaining the degree of in-focus higher in the evaluation value than the degree of in-focus with the curvature of the imaging plane for correcting the image plane curve.

3. The imaging apparatus according to claim 2, wherein the control unit controls the curvature of the imaging plane to, among possible curvatures of the imaging plane, change the curvature of the imaging plane to the curvature with the higher evaluation value.

4. The imaging apparatus according to claim 1, wherein, in a case where the adjustment unit does not adjust the position of the focus adjustment lens to the end portion of the predetermined movable area, the control unit performs the control of the curvature of the imaging plane for correcting the image plane curve in the optical system on a priority basis.

5. The imaging apparatus according to claim 1, further comprising an operation unit that accepts a user operation for starting the adjustment of the focus adjustment lens by the adjustment unit, wherein
    when the adjustment unit adjusts the position of the focus adjustment lens to the end portion of the predetermined movable area and the user operation on the operation unit lasts beyond a predetermined threshold, the control unit performs the control of the curvature of the imaging plane for bringing the image signal into focus on a priority basis.

6. The imaging apparatus according to claim 1, further comprising an operation unit that accepts a user operation for starting or ending the adjustment of the focus adjustment lens by the adjustment unit, wherein
    in a case where the adjustment unit adjusts the position of the focus adjustment lens to the end portion of the predetermined movable area and the operation unit accepts a predetermined series of user operations, the control unit performs the control of the curvature of the imaging plane for bringing the image signal into focus on a priority basis, and
    the predetermined series of user operations includes operations for starting the adjustment of the focus adjustment lens, then ending the adjustment, and then starting the adjustment of the focus adjustment lens that lasts beyond a predetermined threshold.

7. The imaging apparatus according to claim 1, further comprising a setting unit that sets an operation mode of the imaging apparatus to any of a plurality of operation modes including a predetermined mode, wherein in a case where the adjustment unit adjusts the position of the focus adjustment lens to the end portion of the predetermined movable area and the operation mode is the predetermined mode, the control unit performs the control of the curvature of the imaging plane for bringing the image signal into focus on a priority basis.

8. The imaging apparatus according to claim 7, wherein the predetermined mode is an operation mode for enabling an operation for changing the curvature of the imaging plane and obtaining focus on the subject.

9. The imaging apparatus according to claim 1, wherein the optical system further includes a zoom lens that operates to move forward and backward in a predetermined movable area in an optical axis direction, and
the control unit controls the curvature of the imaging plane for correcting an image plane curve in the optical system according to the position of the zoom lens.

10. The imaging apparatus according to claim 1, wherein the imaging element is configured to control the curvature of the imaging plane by magnetic force.

11. A control method of an imaging apparatus including: an optical system that includes a focus adjustment lens that operates to move forward and backward in an optical axis direction in a predetermined movable area; and an imaging element that has an imaging plane capable of being curved and that captures an image of a subject formed via the optical system, the control method comprising:

evaluating at which an evaluation unit determines an evaluation value indicating a degree of in-focus of an image signal output from the imaging element based on the image signal;

adjusting at which an adjustment unit adjusts, based on the evaluation value, a position of the focus adjustment lens to, among positions in the predetermined movable area, a position with the highest evaluation value; and controlling at which the control unit performs control of the curvature of the imaging plane for correcting an image plane curve in the optical system and performs control of the curvature of the imaging plane for bringing the image signal into focus, wherein at the controlling, when the adjustment unit adjusts the position of the focus adjustment lens to an end portion of the predetermined movable area, the control of the curvature of the imaging plane for bringing the image signal into focus is performed on a priority basis.

\* \* \* \* \*